April 28, 1970　　M. D. LAWRENCE ET AL　　3,508,989
METHOD OF FORMING ENDLESS MAGNETIC TAPE LOOPS
Filed May 20, 1966　　　　　　　　　　　　　2 Sheets-Sheet 1
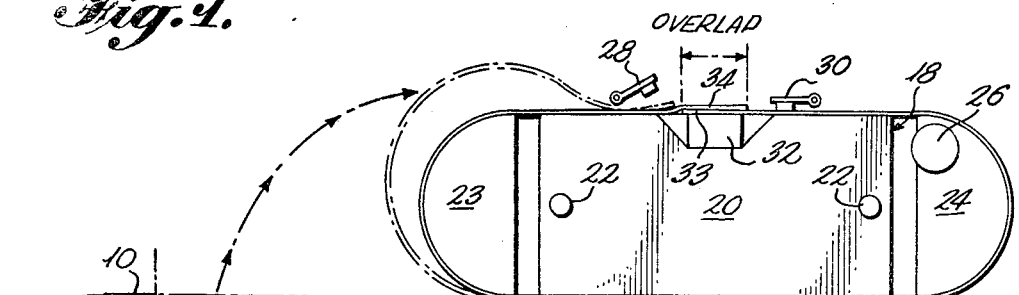
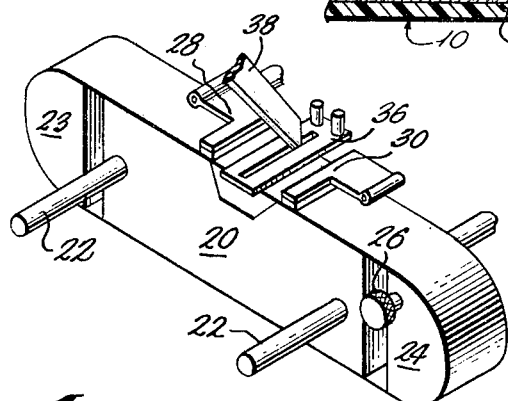
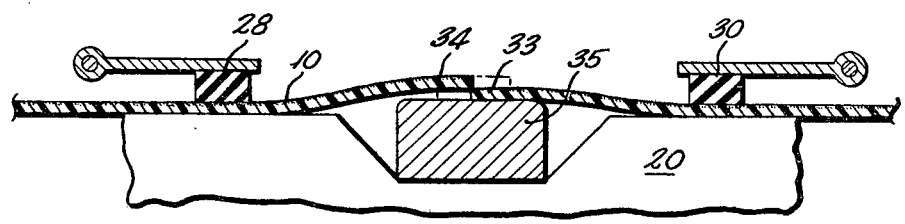
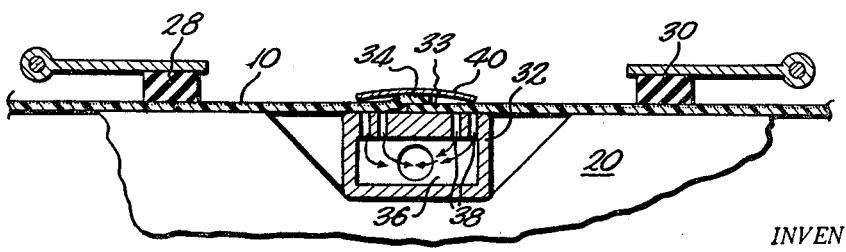
INVENTORS
Murray D. Lawrence &
BY  Louis G. Metzger
Lane, Aiken, Dunner & Ziems
ATTORNEYS

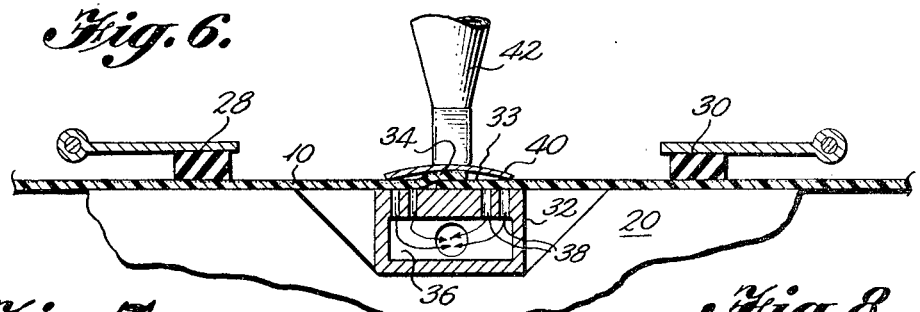
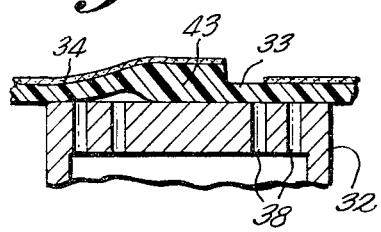
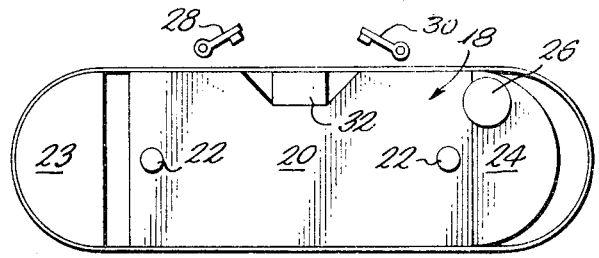
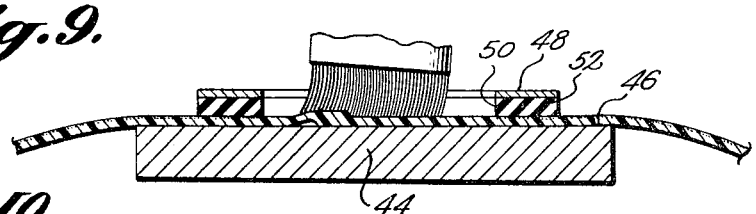
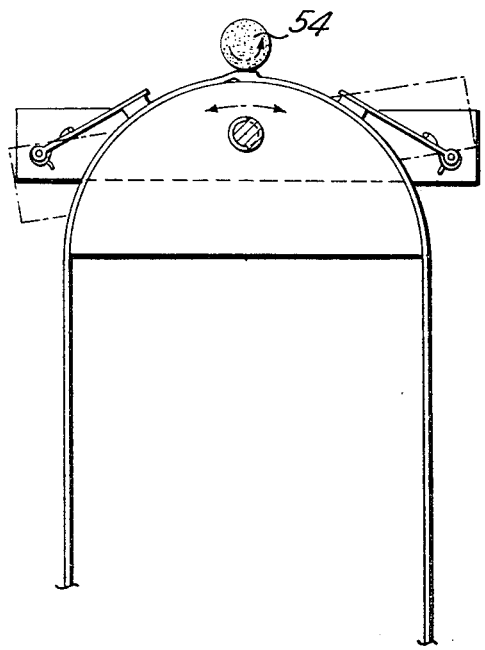
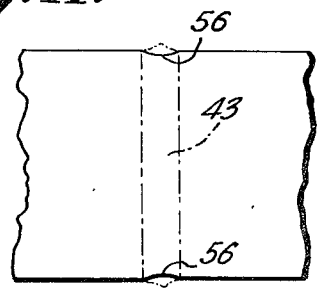
INVENTORS
Murray D. Lawrence &
BY Louis G. Metzger
Lane, Aitken, Dunner & Ziems
ATTORNEYS United States Patent Office 3,508,989
Patented Apr. 28, 1970

3,508,989
METHOD OF FORMING ENDLESS MAGNETIC TAPE LOOPS
Murray D. Lawrence, Kings Park, and Louis G. Metzger, New York, N.Y., assignors to Potter Instrument Company, Inc., Plainview, N.Y., a corporation of New York
Filed May 20, 1966, Ser. No. 551,732
Int. Cl. B32b 31/00
U.S. Cl. 156—154          7 Claims

ABSTRACT OF THE DISCLOSURE

A method of forming magnetic tape loops of the type used in information storage systems, in which a length of tape stock is cut to a length slightly in excess of the loop to be formed thereby to provide overlapping end portions, joining the overlapped end portions by welding and reducing the thickness of the splice formed by welding to approximately the thickness of the tape stock. The precise length of the tape stock is established by wrapping the tape around a mandrel having a peripheral dimension corresponding to the tape loop and cutting overlapped end portions of the tape after they have been moved away from the mandrel periphery to establish the length of tape overlap.

---

This invention relates to methods of forming tape loops, and more particularly, it concerns a method of forming magnetic tape loops used in information storage systems of the type disclosed in a copending application entitled "Random Access Memory," Ser. No. 535,747, filed Mar. 21, 1966 by Andrew Gabor, and assigned to the assignee of the present invention.

In the information storage equipment disclosed in the abovementioned copending application, information, at packing densities of 1,000 bits per inch, is stored on continuous flexible tape loops driven at speeds of approximately 600 inches per second. Because of such high packing densities and high tape velocity, it is extremely important that the tape loops are accurately formed both from the standpoint of the linear dimension or peripheral length of the tape loop and also from the standpoint of achieving uniform physical characteristics completely throughout the loop.

In accordance with the present invention, a unique method of forming such magnetic tape loops is provided by which the aforementioned dimensional accuracy and uniformity are achieved. Generally, the method of this invention involves wrapping a length of magnetic tape about a mandrel, having a precisely established peripheral dimension, in such a manner that the free ends of the tape overlap one another, and firmly clamping the tape to the mandrel at points located on each side of the overlapped end portions. The overlapped end portions are then moved outwardly by a cutting anvil to such an extent that they are moved relative to one another in a longitudinal direction and both end portions are simultaneously severed along a transverse line. After cutting, the end portions are moved back into engagement with the mandrel so that they overlap each other by the precise amount to which they were moved longitudinally relative to each other during the movement away from the mandrel prior to cutting. While the overlapped end portions of the tape are held against the mandrel by suction, they are welded to effect a splice. Thereafter, the loop is removed from the mandrel and the thickness of the splice reduced approximately to the original thickness of the tape.

Among the objects of the present invention are: the provision of a unique method for forming magnetic tape loops of the type referred to and by which required dimensional accuracy is maintained; to provide a method of forming tape loops by which substantially uniform physical characteristics are attained throughout the length of the tape loop; and the proivsion of a method for forming tape loops by which a high degree of accuracy may be maintained without requiring a great degree of skill to practice the method.

Other objects and further scope of applicability of the present invention will become apparent from the detailed description given below, taken in conjunction with the accompanying drawings, in which:

FIG. 1 is a front elevation of the tape retaining mandrel together with a length of tape being wrapped thereabout;

FIG. 2 is an enlarged, fragmentary cross-sectional view of the tape used to form tape loops in accordance with this invention;

FIG. 3 is a schematic perspective view depicting the tape cutting operation;

FIG. 4 is an enlarged fragmentary cross-section illustrating the respective positions of the tape loop end portions after cutting;

FIGS. 5 and 6 are fragmentary cross-sectional views illustrating the tape welding procedure of this invention;

FIG. 7 is an enlarged, fragmentary cross-section through the welded splice formed in accordance with this invention;

FIG. 8 is a front elevation view similar to FIG. 1 showing the tape loop being removed from the mandrel;

FIG. 9 is a fragmentary cross-section depicting the removal of the magnetic coating on the tape to provide a magnetic window in the region of the splice;

FIGS. 10 and 11 illustrate the finishing procedures performed on the tape splice in accordance with this invention; and FIG. 12 is an enlarged cross-section through the finished tape loop in the region of the splice.

As shown in the drawings, particularly in FIGS. 1 and 2 thereof, tape stock 10, supplied on a spool 12, is employed to practice the method of this invention. Preferably, though not necessarily, the tape stock 10 is approximately two inches in width and 0.0017 inch (1.7 mils) in thickness, the latter dimension being established by a carrier base 14, 1.5 mils in thickness, of suitable synthetic resinous material conventionally used in magnetic storage tapes, and an oxide coating 16, 0.2 mil thick, capable of magnetic orientation in accordance with well established principles of magnetic recording and information storage.

In accordance with the method of this invention, the tape 10 is drawn from the spool 12 and trained about a mandrel 18 which is adjustable to provide an outer peripheral length substantially equal to the length of tape loop to be formed. The mandrel includes a carriage part 20, movably supported on rods or ways 22 in the embodiment shown, and a pair of semi-cylindrical end members or turn-arounds 23 and 24, at least one of which is adjustable by means including a clamping knob 26 to establish precisely the desired outer or peripheral dimension. A pair of clamps 28 and 30 are positioned on opposite sides of a welding anvil 32 so that the tape 10 may be firmly clamped against the carriage block 20.

When the mandrel 18 has been properly adjusted to establish the precise length of tape loop to be formed, the splicing procedure is begun by removing the oxide layer 16 from an area of the tape 10 extending across the width of the tape and for approximately ¾ inch along the length of the tape beginning at the free end 33 thereof. A more complete description of the manner in which the layer 16 is removed follows below. Then, the tape 10 is withdrawn from the spool 12, with the oxide layer 16 thereof facing downwardly as it is shown in FIG. 1 of the drawings, the free end 33 placed over the welding anvil 32, and the clamp 30 engaged to retain the tape firmly in this position. The tape is then cut roughly oversize and the cut end 34 wrapped about the mandrel to provide a significant overlap with the other free end as shown in FIG. 1 of the drawings. The clamp 28 is then moved against the tape and the carriage block 20 so that the cut length of tape 10 is fixed firmly to the mandrel 18. With the length of tape 10 fixed to the mandrel 18 as shown in FIG. 1, the mandrel is moved on the guide rods 22 so that the overlapping end portions 33 and 34 of the tape ride up on a cutting anvil 35 as shown in FIGS. 3 and 4 of the drawings. The cutting anvil is dimensioned so that as the end portions of the tape 10 are positioned thereon, they move outwardly away from the plane in which they were maintained on the mandrel 18 so as to cause a slight relative longitudinal movement between the overlapping end portions. In other words, the peripheral dimension established by the mandrel 18 and the cutting anvil 35 is slightly larger than that provided by the mandrel and the welding anvil 32. While the end portions are so positioned on the cutting anvil 35, a guide plate 36 is placed over the anvil 35 and both of the overlapping end portions 33 and 34 cut simultaneously by means, such as a knife 38. The orientation of the cut end portions 33 and 34 of the tape at this point are shown in FIG. 4 of the drawings.

After the waste portions of the tape resulting from the cutting operation have been removed and the tape end portions properly cleaned by vacuum dusting, the carriage 20 is retracted so that the tape end portions again rest on the welding mandrel 32. As shown in FIGS. 5–7 of the drawings, the welding mandrel is provided with a vacuum chamber 36 and ports 38 communicating with the upper surface thereof so that upon connecting the vacuum chamber 36 to an appropriate vacuum source (not shown), the tape end portions are drawn firmly against the upper surface of the welding anvil 32. Also, because of the increased peripheral length provided by the cutting anvil 35 during cutting, the end portions 33 and 34 of the tape 10 again overlap by a slight, though precisely established and uniform, distance completely across the width of the tape.

While the end portions of the tape are held against the welding anvil as shown in FIGS. 5 and 6 of the drawings, a tape protector leaf 40, in the form of a thin sheet of metal, is placed over the overlapping end portions 33 and 34 of the tape. Then, an ultrasonic welding head 42 is brought down against the leaf and overlapping ends of the tape 10 on the welding anvil 32. Preferably, the carriage 20 is moved to various positions under the welding head 42 initially, to spot weld the overlapping end portions of the tape. Then, the carriage 20 of the mandrel and the head 42 are operated to weld the end portions 33 and 34 completely and uniformly across the width of the tape to provide a splice 43 as shown in FIG. 7. After the splice has been completely formed in this manner, the turn-around 24 on the mandrel 18 is retracted, the clamps 28 and 30 released, and the spliced tape loop removed from the mandrel 18.

Upon removal of the tape loop from the mandrel 18, the direction of weld overlap is determined and the loop placed on a support 44 having a planar surface 46. A stencil 48 having a rectangular opening 50 established by a gasket 52 is placed firmly over the tape in such a manner that one edge of the opening 50 is positioned approximately ⅛ inch upstream from the direction of the overlap visible on the outer surface surface of the tape. The opening 50 extends across the width of the tape and further, is approximately 11/32 of an inch in the dimension oriented along the length of the tape loop. With the stencil 48 in place, a solvent is applied to the oxide layer 16 and the oxide layer 16 is removed with a stiff brush and wiped clean with cotton pads. By so removing the oxide layer 16 in the vicinity of the splice 43, a magnetic window is provided in the tape loop, which in use, operates to provide an index reference on the tape and used during transducing operations.

It will be appreciated that the above-described technique for removing the oxide layer 16 to form the magnetic window will be used also in removing the oxide layer from the area adjacent to the free end 33 prior to welding. In addition, it is contemplated that the tape stock 10 may be provided with magnetic windows (i.e. areas extending across the width of the tape in which the oxide layer 16 is removed) at precisely spaced points along its length, as it is supplied on the spool 12. In this manner, the splicing operation can be carried out without the need for oxide removal during the operation.

Regardless of the way in which the magnetic window is formed, after welding, the tape loop is placed on a grinding jig generally shown in FIG. 10 of the drawings and the thickness of the splice reduced to approximately the thickness of the tape. As shown in FIG. 7 of the drawings, because the end portions 33 and 34 of the tape are overlapped during the welding step, the thickness at the splice is about ⅔ of a double thickness of the tape. Hence, by rocking the tape back and forth beneath a grinding wheel 54 and traversing the length of the splice across the width of the tape, the thickness of the splice is reduced to a thickness slightly greater than the single thickness of the tape. Preferably, this step in the method of this invention involves first grinding the splice to reduce its thickness and then polishing the ground area with a nylon felt impregnated with very fine aluminum oxide to establish a surface comparable with the original surface of the tape. Also, the ends of the splice on opposite sides of the tape project slightly upwardly from the outer margins of the tape after welding as shown in FIG. 11 of the drawings. These projecting portions of the tape are cut along lines 56 as shown in FIG. 11 so that the splice in no way interferes with the outer margin of the tape. Also, it is contemplated that the rear surface of the splice may be built up slightly by coating to assure a full tape thickness throughout the region of the splice.

Thus it will be seen that by this invention, there is provided an improved method for forming magnetic tape loops by which the above-mentioned objectives, among others, are completely fulfilled.

The invention claimed is:

1. The method of forming an endless magnetic tape loop for use in information storage systems comprising the steps of: wrapping a length of tape about a mandrel so that the ends of the tape overlie one another in overlapping fashion, the peripheral dimension of said mandrel being equal to the length of the tape loop to be formed; clamping the tape to the mandrel on opposite sides of the overlapping end portions of the tape; moving the overlapping end portions away from the mandrel by an amount sufficient to cause the end portions to move longitudinally relative to one another; simultaneously cutting through both of the overlapping end portions across the width of the tape while they are positioned away from the mandrel; moving the cut end portions back against the mandrel so that they again overlap each other by the amount to which they moved longitudinally relative to each other during said movement away from the mandrel; splicing the overlapped end portions to each other to form the loop; and removing the loop from the mandrel.

2. The method recited in claim 1 wherein said overlapping end portions are spliced by welding.

3. The method recited in claim 2 including further, the step of reducing the thickness of the welded portions of the tape loop to approximately the thickness of the tape.

4. The method recited in claim 2 wherein said tape includes a base and a layer of magnetic material on said base, and including further, the step of removing said layer over an area extending across the width of the tape and to each side of the welded end portions.

5. The method recited in claim 4 including further the steps of grinding the splice established by said welded end portions after removal of said layer to reduce the thickness of the splice, and then polishing the ground portion.

6. The method recited in claim 4 in which the step of removing said layer includes placing a stencil over the tape to define said area, applying a solvent to said area, brushing the dissolved layer, and wiping it clean.

7. The method recited in claim 1 in which said cutting step includes drawing a knife across the width of the tape and through both said overlapping end portions.

References Cited

UNITED STATES PATENTS

| 3,331,719 | 7/1967 | Soloff | 156—157 XR |
| 3,086,901 | 4/1963 | Ploeger | 156—159 |
| 3,125,477 | 3/1964 | Laliberte | 156—154 |
| 3,243,487 | 3/1966 | Smith | 156—267 XR |
| 2,985,954 | 5/1961 | Jones et al. | |

PHILIP DIER, Primary Examiner

U.S. Cl. X.R.

156—258, 73, 285; 161—145; 179—100.2